United States Patent [19]

Chan et al.

[11] Patent Number: 4,716,423

[45] Date of Patent: Dec. 29, 1987

[54] BARRIER LAYER AND ORIFICE PLATE FOR THERMAL INK JET PRINT HEAD ASSEMBLY AND METHOD OF MANUFACTURE

[75] Inventors: C. S. Chan; Robert R. Hay, both of Boise, Id.

[73] Assignee: Hewlett-Packard Company, Palo Alto, Calif.

[21] Appl. No.: 915,290

[22] Filed: Oct. 3, 1986

Related U.S. Application Data

[62] Division of Ser. No. 801,169, Nov. 22, 1985, abandoned.

[51] Int. Cl.[4] .................... G01D 15/18; C25D 1/02; G03C 5/00

[52] U.S. Cl. .................... 346/140 R; 204/3; 204/9; 204/11; 204/14.1; 29/157 C; 156/633; 156/644; 156/659.1; 156/661.1; 430/311; 430/312; 346/75

[58] Field of Search .................... 346/140 R, 75; 204/3, 204/9, 11, 14.1; 29/157 C, 592 R; 156/633, 644, 659.1, 661.1; 430/311, 313

[56] References Cited

U.S. PATENT DOCUMENTS

| | | | |
|---|---|---|---|
| 4,255,237 | 3/1981 | Obert et al. | 204/9 |
| 4,290,857 | 9/1981 | Ineda et al. | 204/9 |
| 4,417,946 | 11/1983 | Behclen et al. | 156/643 |
| 4,422,905 | 12/1983 | Becker et al. | 204/9 |
| 4,513,298 | 4/1985 | Scheu | 346/140 R |
| 4,558,333 | 12/1985 | Sugitani et al. | 346/140 R |

*Primary Examiner*—E. A. Goldberg
*Assistant Examiner*—Gerald E. Preston
*Attorney, Agent, or Firm*—William J. Bethurum

[57] ABSTRACT

This application discloses a thermal ink jet printhead and method of manufacture featuring an improved all-metal orifice plate and barrier layer assembly. This assembly includes constricted ink flow ports to reduce cavitation damage and smooth contoured convergent ink ejection orifices to prevent "gulping" of air during an ink ejection process. Both of these features extend the maximum operating frequency, fmax, of the printhead. The nickel barrier layer and the underlying thin film resistor substrate are gold plated and then soldered together to form a good strong solder bond at the substrate - barrier layer interface.

7 Claims, 10 Drawing Figures

STEP 1 - STAINLESS STEEL SUBSTRATE

STEP 2 - POSITIVE PHOTORESIST

STEP 3 - IMAGED PHOTORESIST

STEP 4 - FIRST PLATING

STEP 5 - LAMINATE PHOTORESIST

STEP 6 - IMAGED LAMINATE PHOTORESIST

STEP 7 - SECOND PLATING

SECTION A-A

BARRIER LAYER AND ORIFICE PLATE FOR THERMAL INK JET PRINT HEAD ASSEMBLY AND METHOD OF MANUFACTURE

CROSS REFERENCE TO RELATED APPLICATION

This is a division of application Ser. No. 801,169, filed Nov. 22, 1985 and now abandoned.

TECHNICAL FIELD

This invention relates generally to thermal ink jet printing and more particularly to an ink jet print head barrier layer and orifice plate of improved geometry for extending the print head lifetime. This invention is also directed to a novel method of fabricating this barrier layer and orifice plate.

BACKGROUND ART

In the art of thermal ink jet printing, it is known to provide controlled and localized heat transfer to a defined volume of ink which is located adjacent to an ink jet orifice. This heat transfer is sufficient to vaporize the ink in such volume and cause it to expand, thereby ejecting ink from the orifice during the printing of characters on a print medium. The above predefined volume of ink is customarily provided in a so-called barrier layer which is constructed to have a plurality of ink reservoirs therein. These reservoirs are located between a corresponding plurality of heater resistor elements and a corresponding plurality of orifice segments for ejecting ink therefrom.

One purpose of these reservoirs is to contain the expanding ink bubble and pressure wave and make ink ejection more efficient. Additionally, the reservoir wall is used to slow down cavitation produced by the collapsing ink bubble. For a further discussion of this pressure wave phenomena, reference may be made to a book by F. G. Hammitt entitled *Cavitation and Multiphase Flow Phenomena*, McGraw-Hill 1980, page 167 et seq, incorporated herein by reference.

The useful life of these prior art ink jet print head assemblies has been limited by the cavitation-produced wear from the pressure wave created in the assembly when an ink bubble collapses upon ejection from an orifice. This pressure wave produces a significant and repeated force at the individual heater resistor elements and thus produces wear and ultimate failure of one or more of these resistor elements after a repeated number of ink jet operations. In addition to the above problem of resistor wear and failure, prior art ink jet head assemblies of the above type have been constructed using polymer materials, such as those known in the art by the trade names RISTON and VACREL.

Whereas these polymer materials have proven satisfactory in many respects, they have on occasion exhibited unacceptably high failure rates when subjected to substantial wear produced by pressure waves from the collapsing ink bubbles during ink jet printing operations. Additionally, in some printing applications wherein the printer is exposed to extreme environments and/or wear, these polymer materials have been known to swell and lift from the underlying substrate support and thereby render the print head assembly inoperative.

DISCLOSURE OF INVENTION

The general purpose of this invention is to increase the useful lifetime of these types of ink jet print head assemblies. This purpose is accomplished by reducing the intensity of the pressure wave created by collapsing ink bubbles, while simultaneously improving the structural integrity of the barrier layer and orifice plate and strength of materials comprising same. Additionally, the novel smoothly contoured geometry of the exit orifice increases the maximum achievable frequency of operation, $f_{max}$.

The reduction in pressure wave intensity, the increase in barrier layer strength and integrity, and the increase of $f_{max}$ are provided by a novel barrier layer and orifice plate geometry which includes a discontinuous layer of metal having a plurality of distinct sections. These sections are contoured to define a corresponding plurality of central cavity regions which are axially aligned with respect to the direction of ink flow ejected from a print head assembly. Each of these central cavity regions connect with a pair of constricted ink flow ports having a width dimension substantially smaller than the diameter of the central cavity regions. In addition, these sections have outer walls of a scalloped configuration which serve to reduce the reflective acoustic waves in the assembly, to reduce cross-talk between adjacent orifices, and to thereby increase the maximum operating frequency and the quality of print produced.

A continuous layer of metal adjoins the layer of discontinuous metal sections and includes a plurality of output orifices which are axially aligned with the cavities in the discontinous metal layer. These orifices have diameters smaller than the diameters of the cavities in the discontinuous layer and further include contoured walls which define a convergent output orifice and which extend to the peripheries of the cavities. This convergent output orifice geometry serves to reduce air "gulping" which interfers with the continuous smooth operation of the ink jet printhead. Gulping is the phenomenon of induced air bubbles during the process of bubble collapsing.

By limiting the width of the ink flow ports extending from the cavities defined by the discontinuous metal layer, the resistance to pressure wave forces within the assembly is increased. This feature reduces and minimizes the amount of "gulping" and cavitation (and thus cavitation-produced wear) upon the individual heater resistor elements in the assembly. Additionally, the limited width of these ink flow ports serves to increase the efficiency of ink ejection and limits the refill-time for the ink reservoirs, further reducing cavitation damage. Furthermore, by using a layered nickel barrier structure instead of polymer materials, the overall strength and integrity of the print head assembly is substantially increased.

Accordingly, it is an object of the present invention to increase the lifetime of thermal ink jet print head assemblies by reducing cavitation-produced wear on the individual resistive heater elements therein.

Another object is to increase the lifetime of such assemblies by increasing the strength and integrity of the barrier layer and orifice plate portion of the ink jet print head assembly.

A further object is to increase the maximum achievable operating frequency, $f_{max}$, of the ink jet print head assembly.

A feature of this invention is the provision of a smoothly contoured wall extending between the individual ink reservoirs in the barrier layer and the output exit orifices of the orifice plate. This contoured wall defines a convergent orifice opening and serves to reduce the rate of ink bubble collapse and reduce the interference with the next succeeding ink jet operation.

Another feature of this invention is the provision of a economical and reliable fabrication process used in construction of the nickel barrier layer and orifice plate assembly which requires a relatively small number of individual processing steps.

Another feature of this invention is the precise control of barrier layer and orifice plate thickness by use of the electroforming process described herein.

These and other objects and features of this invention will become more readily apparent in the following description of the accompanying drawings.

BEST MODE FOR CARRYING OUT THE INVENTION

Figure 1A:
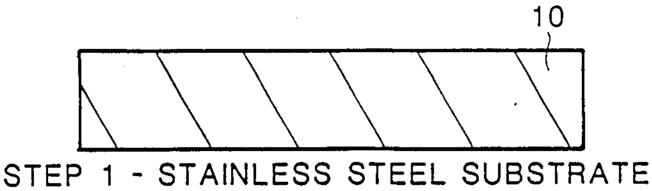
FIGS. 1A through 1H are schematic crosssectional diagrams illustrating the sequence of process steps used in the fabrication of the barrier layer and orifice plate assembly according to the invention.
Figure 1B:
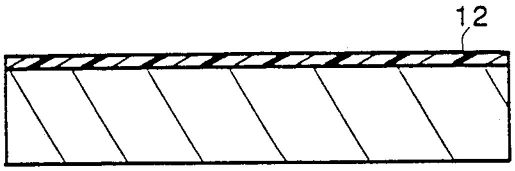

Referring now to FIG. 1, there is shown in FIG. 1A a stainless steel substrate 10 which is typically 30 to 60 mils in thickness and has been polished on the upper surface thereof in preparation for the deposition of a positive photoresist layer 12 as shown in FIG. 1B. The positive photoresist layer 12 is treated using a conventional masking, etching and related photolithographic processing steps known to those skilled in the art in order to form a photoresist mask 14 as shown in FIG. 1C. Using a positive photoresist and conventional photolithography, the mask portion 14 is exposed to ultraviolet light and thereupon is polymerized to remain intact on the surface of the stainless steel substrate 10 as shown in FIG. 1C. The remaining unexposed portions of the photoresist layer 12 are developed using a conventional photoresist chemical developer.

Figure 1C:
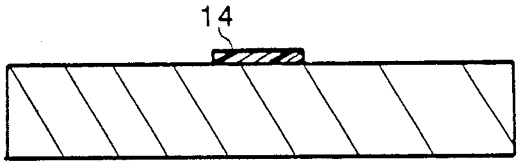
Figure 1D:
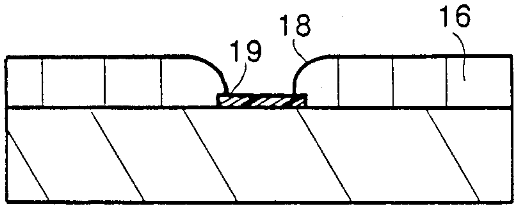

Next, the structure of FIG. 1C is transferred to an electroforming metal deposition station where a first, continuous layer 16 of nickel is deposited as shown in FIG. 1D and forms smoothly contoured walls 18 which project downwardly toward what eventually becomes the output orifice 19 of the orifice plate. This contour 18 is achieved by the fact that the electroformed first nickel layer 16 overlaps the outer edges of the photoresist mask 14, and this occurs because there will be some electroforming reaction through the outer edges of the photoresist mask 14. This occurs due to the small 3 micron thickness of the photoresist mask 14 and the fact that the electroforming process will penetrate the thin mask 14 at least around its outer edge and form the convergent contour as shown.

Electroforming is more commonly known as an adaptation of electroplating. The electroplating is accomplished by placing the part to be plated in a tank (not shown) that contains the plating solution and an anode. The plating solution contains ions of the metal to be plated on the part and the anode is a piece of that same metal. The part being plated is called the cathode. Direct current is then applied between the anode and cathode, which causes the metal ions in the solution to move toward the cathode and deposit on it. The anode dissolves at the same rate that the metal is being deposited on the cathode. This system (also not shown) is called an electroplating cell.

At the anode, the metal atoms lose electrons and go into the plating solution as cations. At the cathode, the reverse happens, the metal ions in the plating solution pick up electrons from the cathode and deposit themselves there as a metallic coating. The chemical reactions at the anode and cathode, where M represents the metal being plated, are:

Anode: $M\ M^{+}+e^{-}$

Cathode: $M^{+}+e^{-}\ M$

Electroforming is similar to electroplating, but in the electroforming process an object is electroplated with a metal, but the plating is then separated from the object. The plating itself is the finished product and in most cases, the object, or substrate 10 in the present process, can be reused many times. As will be seen in the following description, the removed plating retains the basic shape of the substrate surface and masks thereon.

Figure 1E:
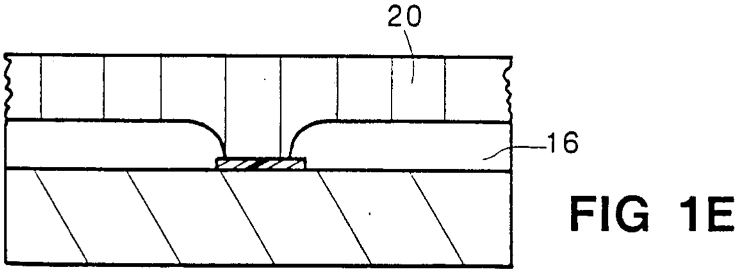
Figure 1F:
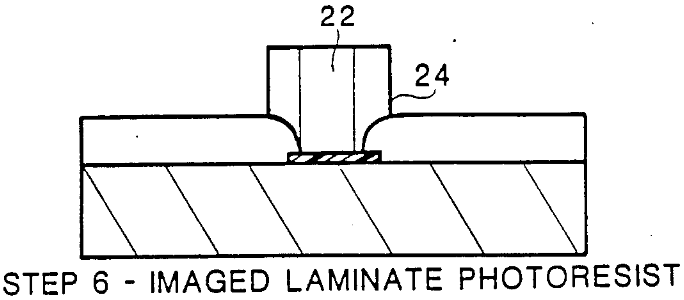

In the next step shown in FIG. 1E, a thick layer of laminated photoresist 20, typically 3 mils in thickness, is deposited on the upper surface of the first layer 16 of nickel and thereafter the coated structure is transferred to a photolithographic masking and developing station where a second photoresist mask 22 is formed as shown on top of the first photoresist mask 14 and covers the contoured wall section 18 of the first stainless steel layer 16. This second photoresist mask 22 includes vertical side walls 24 of substantial vertical thickness, and these steep walls prevent any electroforming beyond these vertical boundaries in the next electroforming step illustrated in FIG. 1G.

Figure 1G:
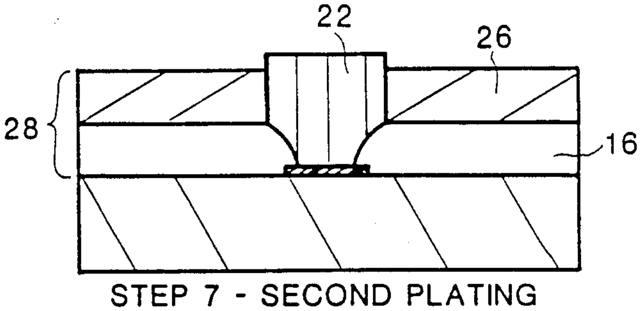
Figure 1H:
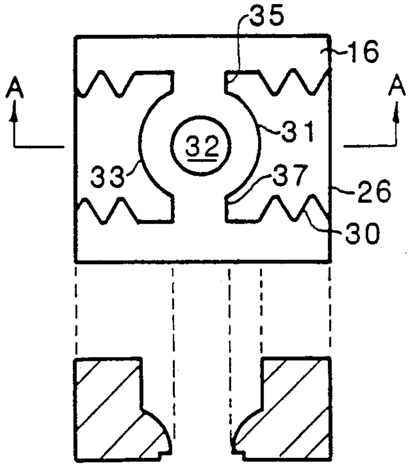

In the second plating or electroforming step shown in FIG. 1G, a second, discontinuous layer 26 of nickel is formed as shown on the upper surface of the first nickeel layer 16, and the first and second layers 16 and 26 of nickel are approximately a combined thickness of 4 mils. The thickness of layer 16 will be about 0.0025 inches and the thickness of layer 26 will be about 0.0015 to 0.0020 inches. The second photoresist mask 22 is shaped to provide the resultant discontinuous and scalloped layer geometry shown in FIG. 1H, including the arcuate cavity walls 31 and 33 extending as shown between the ink flow ports 35 and 37 respectively. The scalloped wall portions 30 of the discontinuous second layer of metal 26 serve to reduce acoustic reflective waves and thus reduce cross-talk between adjacent orifices 32.

A significant advantage of using the above electroforming process lies in the fact that the nickel layer thickness may be carefully controlled to any desired measure. This feature is in contrast to the use of VACREL and RISTON polymers which are currently available from certain vendors in only selectively spaced thicknesses.

Once the barrier layer and orifice plate-composite structure 28 is completed as shown in FIG. 1G, the structure of FIG. 1G is transferred to a chemical stripping station where the structure is immersed in a suitable photoresist stripper which will remove both the first and second photoresist masks 22 and 24, carrying with them the stainless steel substrate 10. Advantageously this substrate 10 has been used as a carrier or "handle" throughout the first and second electroforming steps described above and may be reused in subsequent electroforming processes. Thus, the completed barrier layer and orifice plate assembly 28 is now ready for transfer to a gold plating bath where it is immersed in the bath for a time of approximately one minute in order to form a thin coating of gold over the nickel surface of about 20 micrometers in thickness.

This gold plating step per se is known in the art and is advantageously used to provide an inert coating to prevent corrosion from the ink and also to provide an excellent bonding material for the subsequent thermosonic (heat and ultrasonic energy) bonding to solder pads formed on the underlying and supporting thin film resistor substrate. Thus, the fact that the metal orifice plate and barrier layer may be gold plated to produce an inert coating thereon makes this structure highly compatible with the soldering process which is subsequently used to bond the barrier layer to the underlying passivation top layer of the thin film resistor substrate. That is, nickle which has not been gold plated is subject to surface oxidation which prevents the making of good strong solder bonds. Also, the use of polymer barrier materials of the prior art prevents the gold plating thereof and renders it incompatible with solder bonding.

Figure 2:
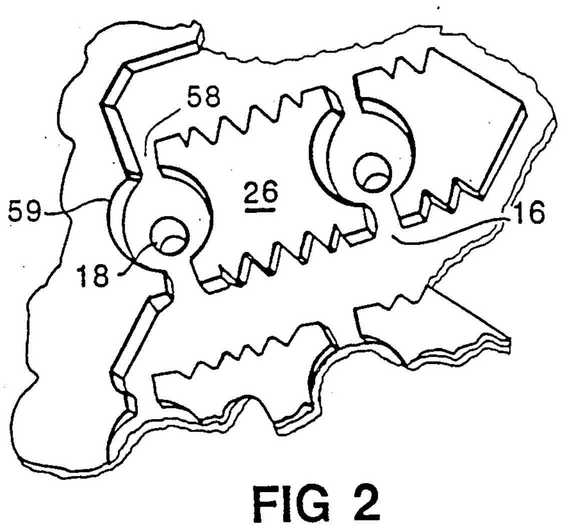
FIG. 2 is an isometric view of the barrier layer and orifice plate assembly of the invention, including two adjacent ink reservoir cavities and exit orifices.

Referring now to FIG. 2, there is shown an isometric view looking upward through the exit orifices of the composite barrier layer and orifice plate assembly 28. The contoured walls 18 extend between the output orifice opening and the second nickel layer 26 and serve to increase the maximum achievable operating frequency, $f_{max}$, of the ink jet print head when compared to prior art barrier plate configurations having no such contour. In addition, this nickle-nickle barrier layer and orifice plate and geometry thereof serves to prevent gulping, to reduce cavitation, and to facilitate high yield manufacturing with excellent solder bonding properties as previously desired.

The width of the constricted ink flow port 58 will be approximately 0.0015 inches, or about one-half or less than the diameter of ink reservoir 59. This diameter will typically range from 0.003 to 0.005 inches. The diameter of the output ink ejection orifice 32 will be about 0.0025 inches.

Figure 3:
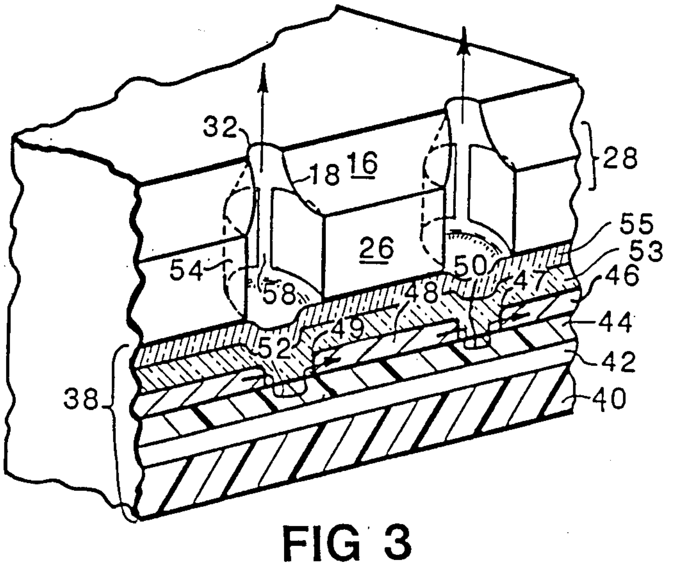
FIG. 3 is a sectioned isometric view illustrating how the barrier layer and orifice plate assembly is mounted on a thin-film resistor structure of a thermal ink jet print head assembly.

Referring now to FIG. 3, the composite barrier layer and orifice plate 28 is mounted atop a thin film resistor structure 38 which includes an underlying silicon substrate 40 typically 20 mils in thickness and having a thin surface passivation layer 42 of silicon dioxide thereon. A layer of electrically resistive material 44 is deposited on the surface of the $S_iO_2$ layer 42, and this resistive material will typically be tantalum-aluminum or tantalum nitride. Next, using known metal conductor deposition and masking techniques, a conductive pattern 46 of aluminum is formed as shown on top of the resistive layer 44 and includes, for example, a pair of openings 47 and 49 therein which in turn define a pair of electrically active resistive heater elements (resistors) indicated as 50 and 52 in FIG. 3.

An upper surface passivation layer 53 is provided atop the conductive trace pattern 46 and is preferably a highly inert material such as silicon carbide, SiC, or silicon nitride, $Si_3N_4$, and thereby serves to provide good physical isolation between the heater resistors 50 and 52 and the ink located in the reservoirs above these resistors.

Next, a layer (or pads) 55 of solder is disposed between the top surface of the passivation layer 53 and the bottom surface of the nickel barrier layer 26, and as previously indicated provides an excellent bond to the gold plated surfaces of the underlying passivation layer 53 and the overlying nickle barrier layer 26.

As is well known in the art of thermal ink jet printing, electrical pulses applied to the aluminum conductor 46 will provide resistance heating of the heater elements 50 and 52 and thus provide a transfer of thermal energy from these heater elements 50 and 52 through the surface passivation layer 53 and to the ink in the reservoirs in the nickel layer 26.

The silicon substrate 40 is bonded to a manifold header (not shown) using conventional silicon die bonding techniques known in the art. Advantageously, this header may be of a chosen plastic material which is preformed to receive the conductive leads 46 which have been previously stamped from a lead frame (also not shown). This lead frame is known in the art as a tape automated bond (TAB) flexible circuit of the type disclosed in copending application Ser. No. 06/801,034 filed 11/22/85 now U.S. Pat. No. 4,635,073 issued 1/16/87 of Gary Hanson and assigned to the present assignee.

In operation, heat is transmitted through the passivation layer 53 and provides rapid heating of the ink stored within the cavities of the barrier layer and orifice plate structure 28. When this happens, the ink stored in these cavities is rapidly heated to boiling and expands through the exit orifices 32. However, when the expanding ink bubble subsequently collapses during cavitation at the ink jet orifices 32, the contour of the convergent output orifices and the reduced width of the constricted ink flow ports 58 serve to slow down the collapse of the ink bubble and thereby reduce cavitation intensity and the damage caused thereby. This latter feature results in a significant resistance to this cavitation-produced downward pressure toward the resistive heater elements 50 and 52.

Thus, there has been described a novel barrier layer and orifice plate assembly for thermal ink jet print heads and a novel manufacturing process therefor. Various modifications may be made to these above described embodiments of the invention without departing from the scope of the appended claims.

What is claimed is:

1. An integrated orifice plate and barrier layer of discontinuous and scalloped wall portions structure for an ink jet printhead manufactured by the process of:

(a) forming a first mask portion having a convergently contoured external surface and a second mask portion having straight vertical walls, and (b) electroforming a first metal layer around said first mask portion to define an orifice plate layer having one or more convergent orifices, and electroforming a second metal layer around said second mask portion to define a barrier layer of discontinuous and scalloped wall portions having one or more ink reservoir cavities aligned respectively with one or more of said convergent orifices in said orifice plate layer.

2. A process for fabricating a barrier layer and orifice plate structure for a thermal ink jet printhead comprising:

a. forming a mask of a predetermined limited thickness on a selected metallic substrate;

b. electroforming a first layer of metal on said substrate and extending in a contoured surface geometry into contact with said mask and defining an orifice output opening;

c. forming a second mask atop said first mask and thicker than said first mask, and having vertical walls extending above the surface of said first layer of metal;

d. electroforming a second layer of metal on said first layer and adjacent said vertical walls of said second mask so as to define an ink reservoir cavity bounded by vertical walls extending from edges of said contoured surface geometry of said first metal layer; and e. removing said first and second masks and said selected metallic substrate, thereby leaving intact said first and second metal layers in a composite layered configuration where said vertical walls of said second layer define boundaries of ink reservoirs of said structure.

3. The process defined in claim 2 wherein said second mask is configured to have discontinuous arcuate side wall sections defining openings which function as ink flow ports for passing ink from the exterior of said second metal layer to said orifice output openings.

4. The process defined in claim 3 wherein said first mask is of contoured geometry and provides an output orifice opening, and said second mask is configured to have a scalloped wall geometry which is replicated in the outer wall geometry of said second metal layer.

5. The process defined in claim 3 wherein said barrier layer and orifice plate structure is aligned and mounted on a thin film resistor structure including an array of resistive heater elements, with said heater elements aligned with respect to the ink reservoirs in said barrier layer and orifice plate assembly.

6. The process defined in claim 5 which further includes die bonding said thin film resistor structure to a header which is also functional to receive conductive leads extending from resistive heater elements in said thin film resistor structure.

7. A process for forming an integrated orifice plate and barrier layer structure which includes the steps of:

a. forming a first mask portion having a convergently contoured external surface and a second mask portion having straight vertical walls, and b. electroforming a first metal layer around said first mask portion to define an orifice plate layer having one or more convergent orifices, and electroforming a second metal layer around said second mask portion to define a barrier layer having one or more ink reservoir cavities aligned respectively with one or more of said convergent orifices in said orifice plate layer.

* * * * *